United States Patent [19]

Marforio

[11] 3,777,850
[45] Dec. 11, 1973

[54] SEWING MACHINE LUBRICATING SYSTEM

[75] Inventor: Nerino Marforio, Milan, Italy

[73] Assignee: S.p.A. Virginio Rimoldi & C.

[22] Filed: Dec. 30, 1971

[21] Appl. No.: 214,163

[30] Foreign Application Priority Data
Feb. 17, 1971 Italy .............................. 20656 A/71

[52] U.S. Cl. ............................................. 184/6.15
[51] Int. Cl. ............................................. D05b 71/00
[58] Field of Search ............... 184/6.15, 6 R, 1 R; 112/256

[56] References Cited
UNITED STATES PATENTS
2,157,371   5/1939   Weis .................................. 112/256
2,879,733   3/1959   Pierce ........................... 184/6.15 X
2,280,198   4/1942   Peterson ....................... 112/256 X
2,156,547   5/1939   Smith ............................... 184/6.15
1,830,104   11/1931  Goosman ......................... 112/256

FOREIGN PATENTS OR APPLICATIONS
22,839   11/1905   Great Britain ..................... 112/256

Primary Examiner—Manuel A. Antonakas
Attorney—John R. Bronaugh et al. and John D. Nies

[57] ABSTRACT

An improved lubricating system for a high speed sewing machine in which all of the moving parts and a portion of the stationary parts of the machine frame contain a series of interconnecting passages to form a high pressure internal lubricating system. Also included is a supply distributor which directs the lubricant into the interconnecting passages and which also provides a low pressure or spray type of lubricating system that affects external lubrication of the various machine operating parts.

2 Claims, 4 Drawing Figures

SEWING MACHINE LUBRICATING SYSTEM

The present invention refers to a lubricating system for sewing machines including a pump to send the lubricant to the various points to be lubricated and to convey and direct the lubricant from the pump to these points which are seatings of friction. The means by which the system works are obtained inside the carrying structure of the machine. In lubricating systems which are the known in the art, the lubricant was sent to the various parts to be lubricated through external pipes in the first part of the system and then through ducts obtained inside the said parts or by means of a spraying of the lubricant which, impregnating the surrounding air, made lubricant fall on the parts to be lubricated. In the well-known systems the lubricant quantity flowing in the various pipes and ducts was considerable because almost each part had to have its own pipe and duct.

In fact, the system involved a pump connected with a sort of supplying distributor from which as many ducts branched out as there were parts to be lubricated. There was also a nozzle whose task was to launch a jet of lubricant against a sight glass through which it was possible to check the efficiency of the system and the lubricant sprayer for all those parts lubricated with a "falling lubrication."

It is clear that this lubricating system in the case of being the only system for all the parts of the machine, can be insufficent for some parts to be lubricated where the friction is very high, because, for example, of the extremely high speeds, or the position of the parts which are sometimes reached with difficulty by the falling lubrication. On the other side, use of a great number of external pipes had the disadvantage of reducing access to the internal parts of the machine, a necessary thing for inspection, checking, or maintenance operations. Besides, the external pipes were subject to accident with consequent reduction in their lubricating power. Additionally these pipes had to be always exactly correspondent with the openings in the parts to be lubricated through which the lubricant flow occurred inside the said parts.

The aim of this present invention is to eliminate the faults of the well-known lubricating systems and to keep clear the internal recesses of the machine where the parts to be lubricated work.

In order to reach this aim the technical problem to be solved was the elimination of all the pipes easily damageable from outside and representing an obstacle to the approach to the various parts of the machine thus reducing at the same time, as far as it is possible, the falling lubrication.

The solutions to this technical problem involves a forced lubricating system in which the various assemblies of parts to be lubricated are placed in parallel and the elements of each group are in cascade. The various assemblies are connected by means of ducts formed in the external and internal walls of the frame, so that the lubricant flows under pressure from the one to the other part to be lubricated, while the excess lubricant falls into a lubricant reservoir where the pump works after lubricating other parts. It is therefore a lubricating system completely under pressure of the cascade or serial and parallel type, while the systems of the known systems were only in parallel and the lubricant was partially under pressure. The main advantage of the system according to the present invention is represented by the fact that in this way possible replacements of parts, additions of more parts, or regulations are not any more hindered by the presence of pipes or other parts.

Another considerable advantage is represented by the flowing under pressure in the main duct to all the parts to be lubricated, so that the same lubricant enters between the contact surfaces and lubricates them only with the quantity required by the individual parts and without any waste. It is to be pointed out that, in spite of the lubricant economy, even the farthest points of the parts to be lubricated are sufficiently lubricated in a way that the lubricating system has always a good safety margin.

Other objects and advantages of the invention will become apparent from the description now to follow, of a preferred embodiment thereof shown by way of example in the accompanying, partly diagrammatic, drawings in which.

Figure 1:
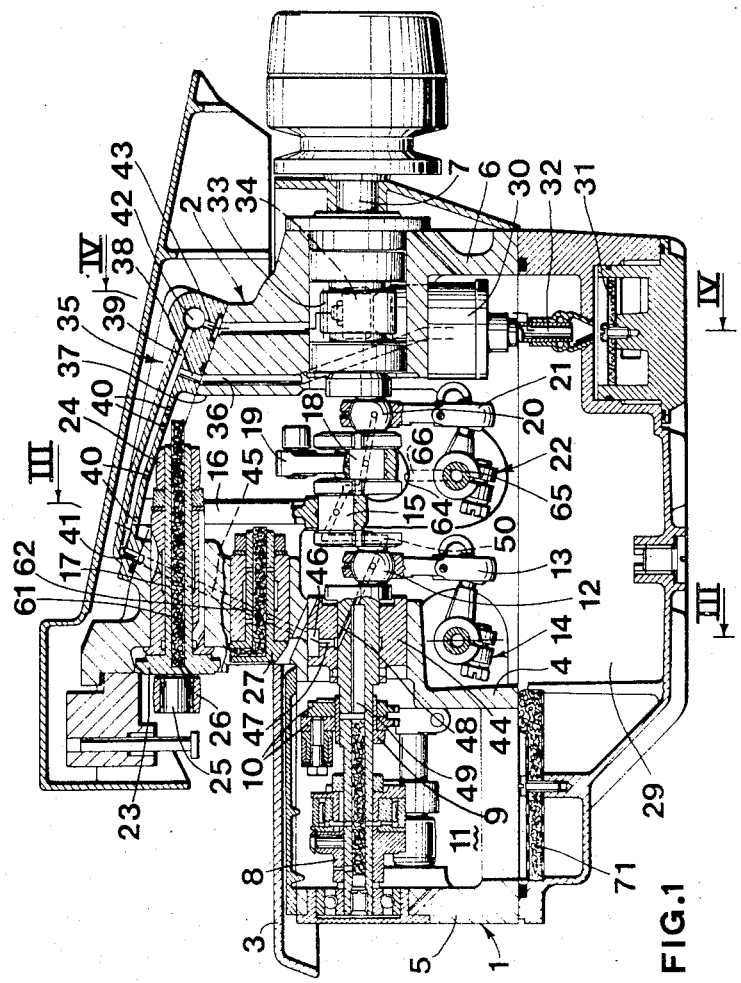
FIG. 1 shows a longitudinal diagram section of a sewing machine on which the lubricating system according to the invention was mounted.

With reference to the FIG. 1, a sewing machine is usually composed by a frame having a bed 1, a vertical standard 2 mounted on the said bed on the side of the work supporting base 3 and a partition 4. Inside the same frame there are placed and carried by it all those parts taking part in the right working of the sewing machine. Inside the bed 1 and supported by the two furthest side walls 5 and 6 and the partition 4 the longitudinal rotably shaft or main shaft 7 is placed. It supports and puts in motion all the means for advancing the work, such as, for example, the stitch length adjusting eccentric 8, the feed lift eccentric 9 and the feed bars 10. These means are in the recess 11, on the left of the partition 4 when looking at the FIG. 1. The central part of the main shaft 7 is provided with cranks 12 and relative pitmans 13 for the working of the stitch forming and work trimming means (in the case they are requested). More exactly the crank 12 and the pitman 13 are used for the working of the primary looper, not shown but represented by the control assembly 14; the crank 15 and the pitman 16 for the working of the upper rock shaft 17 for the needle control; the crank 18 and the pitman 19 for the working of the trimming knife (not shown); and finally, the crank 20 and the pitman 21 for the working of the secondary looper (also not shown) represented by the control assembly 22.

The needle driving device includes, among other things, a crank 23 fixed on one end of the upper rock shaft 17, on which other end being keyed an arm 24 directly connected with the needle clamp (not shown). The crank 23 is provided with a crank pin 25 on which the control lever 25 is hinged and directly connected with the needle clamp (not shown). Finally, a pin 27 protrudes on the outside of the vertical standard 2 near the work supporting base 3, like the crank 23 in order to pivot on arm (not shown) for the above-mentioned control lever 26. The forced lubricating system which is the subject of the present invention is designed to lubricate all the moving means and the device of the machine so as to keep low the temperature levels due to the friction between the moving means during the working of the machine.

The lubricant flows first to a proper reservoir 29 on the bottom of the machine bed from where it is sucked by a pump 30 of the kind, for example, with gears, through a purification filter 31 and a suction duct 32.

The pump 30 is moved by the main shaft by means of a worm 33 and relative worm gear 34. The lubricant thus sucked is sent to a supply distributor 35 through a supply duct 36 fully formed in the frame of the machine and particularly in the vertical standard 2. This supply distributor has also the double function to close the vertical standard 2 like a cover on the upper side and to lubricate those means contained in the recess 37 from above, so that it will be indicated with the name of lubricating and distributing cover. It also represents a part of the frame of the machine and can be easily taken out and mounted in its seating, so that it can easily be replaced.

Figure 2:
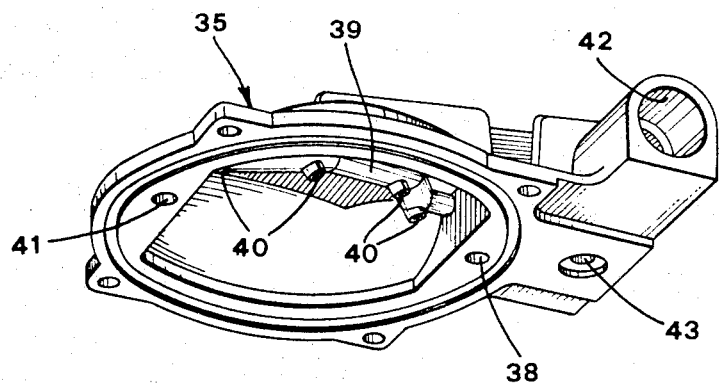
FIG. 2 shows a perspective view of the lubricator and distributing cover of said system according to the present invention.
Figure 3:
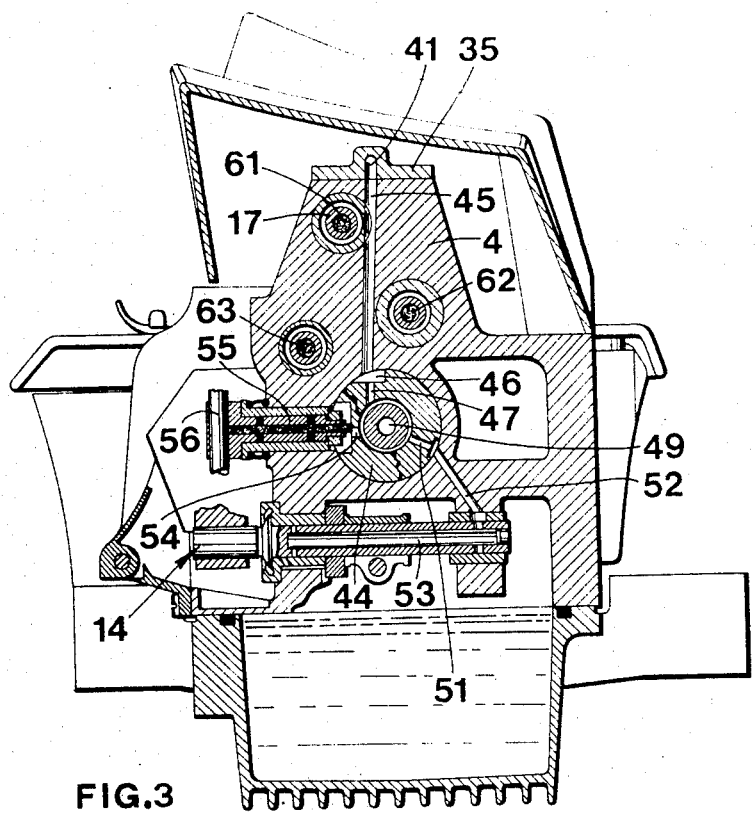
FIG. 3 shows a section view along the line III—III of the FIG. 1.

With reference to the FIG. 2 the distributing cover 35 carries a short supplying duct 38 which is, in his turn, provided with nozzles 40 all oriented in such a way as to direct a jet lubricant on to the means beneath in the recess 37. The lubricant getting to the primary duct 39 is not completely expelled through the duct 42 which works also as a control of the lubricant. The lubricant is sent from the duct 41 to the bearings sleeve 44 supporting the main shaft 7 (FIGS. 1 and 3) through a duct 45 which is formed in the partition 4 and is gathered in a recess 46 formed in the said sleeve.

A radial hole 47 branches out of the recess 46. It is directed to the internal hole of the bearings sleeve and to which other ducts lead.

Through these ducts the lubricant is sent to the various assemblies of moving means each of them being composed of means set in cascade.

Through a hole 48 formed in the main shaft 7 from the outside to the inside, the lubricant flows from the hole 47 to the central hole 49 which sends the lubricant to that part of the shaft contained in the recess 11, so as to lubricate the so-called work feeding mechanism. Another part of the lubricant flows through a duct 50 formed in that part of the main shaft contained in the central recess 37, so as to lubricate the crank assembly 12, 15, 18 and 20. As the lubricating oil sent to the recess 46 is not completely absorbed by the above-mentioned parts, the excess oil is sent through another duct 51 (FIG. 3) to a duct 52 formed in the frame and connected with the central hole 53 of the shaft belonging to the control assembly 14 of the primary looper.

Finally, a last radial hole 54 formed in the bearings sleeve 44 allows to send the lubricant also to the swivel support 55 of the secondary looper support 56 connected with the control assembly 22. As seen up to now, this section of the lubricating system is formed in a way to send to the parts to be lubricated only pressure lubricant.

Figure 4:
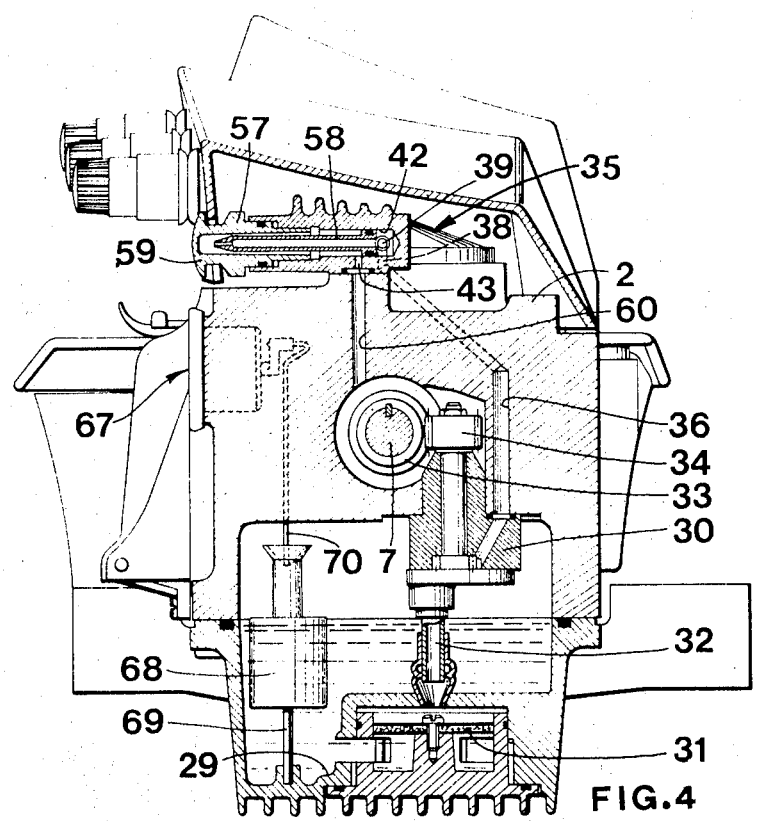
FIG. 4 shows a section view along the line IV—IV of the FIG. 1.

The quantity of lubricant contained in the main duct 39 and not ejected through the nozzles 40 or through the duct 41 flows to the duct 42 where a transparent indicator 57 (FIG. 4) is inserted. The trasparent indicator 57 is formed by a control pipe 58 directly communicating with the duct 39 in a way that the lubricant coming out of the duct 39 under pressure in compelled, by means of proper seals, to flow into the central pipe 58 which, with nozzle-like end violently sprays the lubricant against the transparent part 59 visible from outside, thus revealing its presence. Finally, the lubricant, after fulfilling its task, flows into the free cavity between the duct 42 and the pipe 58 and is then compelled to come out through the hole 43 and the duct 60 up to the lubrication of the worm 33 and the worm gear 34. The lubricant sprayed on to the means inside the recess 37 by means of the nozzles 40 is partially absorbed by the wicks 61 and 62 (FIG. 1), and 63 (FIG. 3) which have the function to keep lubricated those parts which they touch and which are the crank pin 25 of the needle driving device, the base of the pivoting arm and the trimming knife.

A sump 64 for the lubricant is designed in the frame above one of the ends of the central assembly 22 shaft 65 for the working of the secondary looper, so that, through a proper duct 66 similar to the duct 52 for the lubrication of the control assembly 14 (FIG. 3), the lubrication of said assembly 22 is assured. With reference to the FIG. 4 a lubricant level gauge 57 is envisaged in the reservoir 29 of the well-known type and formed, for example, by a float 68 sliding along a steam 69 and carrying on its upper part a conical seating which supports a rod 70. The said rod 70 is provided with a small lever on its upper end which represents the lubricant level gauge in correspondence with a determined scale visible from outside.

According to a way of realization preferred by this invention it is envisaged, besides the purification filter 31, a supplementary filter 71 placed under the sewing means working in the recess 11 through which the lubricant coming from these means flows depositing all its impurities collected in this area, in particular the dust caused by the sewing operation because of the friction between needle and thread, needle and fabric and thread and fabric.

The quantity of impurities on the filter 31 is thus reduced and it can in this way be not so often replaced. Further additions and/or modifications will be brought about by the technicians in this field to the way of embodiment mentioned above and represented by the lubricating system according to the present invention remaining within the limits of protections. In particular, the parts forming the said system can be easily adapted to sewing machines different from the common ones to which reference was made herein.

I claim:

1. In a sewing machine, a frame carrying a work supporting base and including a bed defining a sump below said base for holding a lubricant and walls extending upwardly to a region substantially above said base, a main drive shaft journalled in said frame for rotation below said base and having crank portions to which pitmans are connectable to effect operation of other elements of the sewing machine, a lubricant supply distributor mounted on the upper end of said frame and providing a top cover thereon, a lubricant pump having an inlet connected to said sump and an outlet connected through an internal passage in said frame to said distributor, said internal passage bypassing said base, means defining restricted openings in said distributor permitting limited flow of a portion of said lubricant from said distributor directly into the interior of the sewing machine for external lubrication of moving parts of the machine, and means defining an interconnecting series of closed internal passages extending through stationary and moving parts of the sewing machine to form a high pressure internal lubrication system to which the remainder of said lubricant is delivered by said distributor for ultimate return to said sump.

2. The sewing machine as defined in claim 1 wherein said high-pressure internal lubrication system comprises at least two individual interconnecting series of passages fed from said distributor in parallel.

* * * * *